US007981774B2

(12) United States Patent
Grier et al.

(10) Patent No.: US 7,981,774 B2
(45) Date of Patent: Jul. 19, 2011

(54) ASSEMBLY OF QUASICRYSTALLINE PHOTONIC HETEROSTRUCTURES

(75) Inventors: David G. Grier, New York, NY (US); Yael Roichman, New York, NY (US); Weining Man, Princeton, NJ (US); Paul Michael Chaikin, Pennington, NJ (US); Paul Joseph Steinhardt, Princeton, NJ (US)

(73) Assignee: New York University, New York, NY (US)

( * ) Notice: Subject to any disclaimer, the term of this patent is extended or adjusted under 35 U.S.C. 154(b) by 527 days.

(21) Appl. No.: 11/483,021

(22) Filed: Jul. 7, 2006

(65) Prior Publication Data

US 2007/0119522 A1    May 31, 2007

Related U.S. Application Data

(60) Provisional application No. 60/697,872, filed on Jul. 8, 2005.

(51) Int. Cl.
*H01L 21/20* (2006.01)
*H01L 21/36* (2006.01)

(52) U.S. Cl. .................. 438/479; 438/6; 438/7; 438/32; 438/69; 257/E21.53

(58) Field of Classification Search .................. 438/6, 7, 438/32, 69, 479; 359/7, 296, 566, 221, 325, 359/333; 257/98, 414, 432
See application file for complete search history.

(56) References Cited

U.S. PATENT DOCUMENTS

| 5,245,466 A * | 9/1993 | Burns et al. ................... 359/296 |
| 5,689,109 A * | 11/1997 | Schutze ........................ 250/251 |
| 6,017,403 A * | 1/2000 | Masumoto et al. ........... 148/549 |
| 6,055,106 A * | 4/2000 | Grier et al. .................... 359/566 |
| 2001/0001967 A1* | 5/2001 | Kita et al. ..................... 148/439 |
| 2002/0108859 A1* | 8/2002 | Wang et al. ................... 204/547 |

FOREIGN PATENT DOCUMENTS

WO    WO 02/056431 A2    7/2002

OTHER PUBLICATIONS

E. R. Dufresne and D. G. Grier. "Optical tweezer arrays and optical substrates created with diffractive optics." *Rev. Sci. Instr.* 69, 1974-1977 (1998).
D. G. Grier and E. R. Dufresne. "Apparatus for applying optical gradient forces." U. S. Patent 6,055,106, The University of Chicago (2000).
E. R. Dufresne, G. C. Spalding, M. T. Dearing, S. A. Sheets and D. G. Grier. "Computer-generated holographic optical tweezer arrays." *Rev. Sci. Instr.* 72, 1810-1816 (2001).
J. E. Curtis, B. A. Koss and D. G. Grier. "Dynamic holographic optical tweezers." *Opt. Comm.* 207, 169-175 (2002).
D. G. Grier. "A revolution in optical manipulation." *Nature* 424, 810-816 (2003).

(Continued)

*Primary Examiner* — Charles Garber
*Assistant Examiner* — Abdulfattah Mustapha
(74) *Attorney, Agent, or Firm* — Foley & Lardner LLP

(57) ABSTRACT

A method and system for assembling a quasicrystalline heterostructure. A plurality of particles is provided with desirable predetermined character. The particles are suspended in a medium, and holographic optical traps are used to position the particles in a way to achieve an arrangement which provides a desired property.

22 Claims, 3 Drawing Sheets

OTHER PUBLICATIONS

M. Polin, K. Ladavac, S.-H. Lee, Y. Roichman and D. G. Grier. "Optimized holographic optical traps." *Opt. Express* 13, 5831-5845 (2005).

K. Svoboda and S. M. Block. "Biological applications of optical forces." *Annu. Rev. Biophys. Biomol. Struct.* 23, 247-285 (1994).

D. G. Grier. "Optical tweezers in colloid and interface science." *Cur. Opin. Colloid Interface Sci.* 2, 264-270 (1997).

A. Ashkin. "Optical trapping and manipulation of neutral particles using lasers." *Proc. Nat. Acad. Sci.* 94, 4853-4860 (1997).

A. Ashkin. "History of optical trapping and manipulation of small-neutral particle, atoms, and molecules." *IEEE J. Sel. Top. Quantum Elec.* 6, 841-856 (2000).

J. E. Curtis and D. G. Grier. "Structure of optical vortices." *Phys. Rev. Lett.* 90, 133901 (2003).

J. E. Curtis and D. G. Grier. "Modulated optical vortices." *Opt. Lett.* 28, 872-874 (2003).

S. Sundbeck, I. Gruzberg and D. G. Grier. "Structure and scaling of helical modes of light." *Opt. Lett.* 30, 477-479 (2005).

Y. Roichman, A. S. Waldron, E. Gardel and D. G. Grier. "Optical traps with geometric aberrations." *Appl. Opt.* 45, 3425-3429 (2005).

S.-H. Lee and D. G. Grier. "Robustness of holographic optical traps against phase scaling errors." *Opt. Express* 13, 7458-7465 (2005).

D. G. Grier and Y. Roichman. "Holographic optical trapping." *Appl. Opt.* 45, 880-887 (2006).

Y. Roichman and D. G. Grier. "Projecting extended optical traps with shape-phase holography." *Opt. Lett.* 31, 1675-1677 (2006).

P. T. Korda, G. C. Spalding and D. G. Grier. "Evolution of a colloidal critical state in an optical pinning potential." *Phys. Rev. B* 66, 024504 (2002).

P. T. Korda, M. B. Taylor and D. G. Grier. "Kinetically locked-in colloidal transport in an array of optical tweezers." *Phys. Rev. Lett.* 89, 128301 (2002).

B. A. Koss and D. G. Grier. "Optical peristalsis." *Appl. Phys. Lett.* 82, 3985-3987 (2003).

K. Ladavac, K. Kasza and D. G. Grier. "Sorting mesoscopic objects with periodic potential landscapes: Optical fractionation." *Phys. Rev. E* 70, 010901(R) (2004).

A. Gopinathan and D. G. Grier. "Statistically locked-in transport through periodic potential landscapes." *Phys. Rev. Lett.* 92, 130602 (2004).

M. Pelton, K. Ladavac and D. G. Grier. "Transport and fractionation in periodic potential-energy landscapes." *Phys. Rev. E* 70, 031108 (2004).

S.-H. Lee, K. Ladavac, M. Polin and D. G. Grier. "Observation of flux reversal in a symmetric optical thermal ratchet." *Phys. Rev. Lett.* 94, 110601 (2005).

S.-H. Lee and D. G. Grier. "Flux reversal in a two-state symmetric optical thermal ratchet." *Phys. Rev. E* 71, 060102(R) (2005).

S.-H. Lee and D. G. Grier. "One-dimensional optical thermal ratchets." *J Phys.: Condens. Matt.* 17, S3685-S3695 (2005).

S.-H. Lee and D. G. Grier. "Giant colloidal diffusivity on corrugated optical vortices." *Phys. Rev. Lett.* 96, 190601 (2006).

M. Polin, D. G. Grier and S. R. Quake. "Anomalous vibrational dispersion in holographically trapped colloidal arrays." *Phys. Rev. Lett.* 96, 088101 (2006).

M. W. Berns. "Laser scissors and tweezers." *Sci. Am.* 278, 62-67 (1998).

P. T. Korda, G. C. Spalding, E. R. Dufresne and D. G. Grier. "Nanofabrication with holographic optical tweezers." *Rev. Sci. Instr.* 73, 1956-1957 (2002).

K. Ladavac and D. G. Grier. "Microoptomechanical pump assembled and driven by holographic optical vortex arrays." *Opt. Express* 12, 1144-1149 (2004).

J. Plewa, E. Tanner, D. M. Mueth and D. G. Grier. "Processing carbon nanotubes with holographic optical tweezers." *Opt. Express* 12, 1978-1981 (2004).

K. Ladavac and D. G. Grier. "Colloidal hydrodynamic coupling in concentric optical vortices." *Europhys. Lett.* 70, 548-554 (2005).

Y. Roichman and D. G. Grier. "Holographic assembly of quasicrystalline photonic heterostructures." *Opt. Express* 13, 5434-5439 (2005).

M. Polin, D. G. Grier and Y. Han. "Colloidal electrostatic interactions near a conducting surface." *Phys. Rev. Lett.* submitted for publication (2006).

Y. Han and D. G. Grier. "Colloidal electroconvection in a thin horizontal cell: II. Bulk electroconvection of water during parallel-plate electrolysis." *J. Chem. Phys.* accepted for publication (2006).

Y. Han and D. G. Grier. "Colloidal electroconvection in a thin horizontal cell I. Microscopic cooperative patterns at low voltage." *J. Chem. Phys.* 122, 164701 (2005).

Y. Han and D. G. Grier. "Configurational temperatures and interactions in charge-stabilized colloid." *J. Chem. Phys.* 122, 064907 (2005).

D. G. Grier and Y. Han. "Anomalous attractions in confined charge-stabilized colloid." *J. Phys.: Condens. Matt.* 16, S4145—S4157 (2004).

M. Pelton, D. G. Grier and P. Guyot-Sionnest. "Characterizing quantum-dot blinking using noise power spectra." *Appl. Phys. Lett.* 85, 819-821 (2004).

Y. Han and D. G. Grier. "Configurational temperature of charge-stabilized colloidal monolayers." *Phys. Rev. Lett.* 92, 148301 (2004).

Y. Han and D. G. Grier. "Vortex rings in a constant electric field." *Nature* 424, 267 (2003).

Y. Han and D. G. Grier. "Confinement-induced colloidal attractions in equilibrium." *Phys. Rev. Lett.* 91, 038302 (2003).

S. H. Behrens, J. Plewa and D. G. Grier. "Measuring a colloidal particle's interaction with a flat surface under nonequilibrium conditions." *Euro. Phys. J. E* 10, 115-121 (2003).

A. Gopinathan, T. Zhou, S. N. Coppersmith, L. P. Kadanoff and D. G. Grier. "Weak long-ranged Casimir attraction in colloidal crystals." *Europhys. Lett.* 57, 451-457 (2002).

S. H. Behrens and D. G. Grier. "The charge of glass and silica surfaces." *J. Chem. Phys.* 115, 6716-6721.

S. H. Behrens and D. G. Grier. "Pair interaction of charged colloidal spheres near a charged wall." *Phys. Rev. E* 64, 050401 (R) (2001).

E. R. Dufresne, D. Altman and D. G. Grier. "Brownian dynamics of a sphere between parallel walls." *Europhys. Lett.* 53, 264-270 (2001).

D. G. Grier and S. H. Behrens. "Interactions in colloidal suspensions: Electrostatics, hydrodynamics and their interplay." In "Electrostatic Effects in Biophysics and Soft Matter," edited by C. Holm, P. Kékicheff and R. Podgomik (Kluwer, Dordrecht, 2001).

E. R. Dufresne, T. M. Squires, M. P. Brenner and D. G. Grier. "Hydrodynamic coupling of two Brownian spheres to a planar surface." *Phys. Rev. Lett.* 85, 3317-3320 (2000).

D. G. Grier and J. C. Crocker. "Comment on "Monte Carlo study of structural ordering in charged colloids using a long-range attractive potential"." *Phys. Rev. E* 61, 980-982 (2000).

D. G. Grier. "When like charges attract: Interactions and dynamics in charge-stabilized colloidal suspensions." *J Phys.: Condens. Matt.* 12, A85-A94 (2000).

G. M. Zinkl, B. I. Zwiebel, D. G. Grier and D. Preuss. "Pollen-stigma adhesion in Arabidopsis: a species-specific interaction mediated by lipophilic molecules in the pollen exine." *Development* 126, 5431-5440 (2000).

E. R. Dufresne and D. G. Grier. "Erratum: Interactions, dynamics, and elasticity in charge-stabilized colloidal crystals (vol. 109, p. 8659, 1998)." *J Chem. Phys.* 110, 8845-8845 (1999).

C.-H. Sow, K. Harada, A. Tonomura, G. Crabtree and D. G. Grier. "Measurement of the vortex pair interaction potential in a Type-II superconductor." *Phys. Rev. Lett.* 80, 2693-2696 (1998).

J. A. Weiss, A. E. Larsen and D. G. Grier. "Interactions, dynamics, and elasticity in charge-stabilized colloidal crystals." *J Chem. Phys.* 109, 8659-8666 (1998).

J. C. Crocker and D. G. Grier. "Interactions and dynamics in charge-stabilized colloid." *MRS Bull.* 23, 24-31 (1998).

M. Mungan, C.-H. Sow, S. N. Coppersmith and D. G. Grier. "Determining pair interactions from structural correlations." *Phys. Rev. B* 58, 14588 (1998).

A. Ashkin, J. M. Dziedzic, J. E. Bjorkholm and S. Chu. "Observation of a single-beam gradient force optical trap for dielectric particles." *Opt. Lett.* 11, 288-290 (1986).

D. G. Grier. "Colloids: A surprisingly attractive couple." *Nature* 393, 621-623 (1998).

M. Reicherter, T. Haist, E. U. Wagemann and H. J. Tiziani. "Optical particle trapping with computer-generated holograms written on a liquid-crystal display." *Opt. Lett.* 24, 608-610 (1999).

J. Liesener, M. Reicherter, T. Heist and H. J. Tiziani. "Multi-functional optical tweezers using computer-generated holograms." *Opt. Comm.* 185, 77-82 (2000).

K. Sasaki, M. Koshioka, H. Misawa, N. Kitamura and H. Masuhara. "Pattern formation and flow control of fine particles by laser-scanning micromanipulation." *Opt. Lett.* 16, 1463-1465 (1991).

J. Glückstad and P. C. Mogensen. "Reconfigurable ternary-phase array illuminator based on the generalised phase contrast method." *Opt. Comm.* 173, 169-175 (2000).

P. C. Mogensen and J. Glückstad. "Dynamic array generation and pattern formation for optical tweezers." *Opt. Comm.* 175, 75-81 (2000).

P. J. Rodrigo, R. L. Eriksen, V. R. Daria and J. Glückstad. "Interactive light-driven and parallel manipulation of inhomogeneous particles." *Opt. Express* 10, 1550-1556 (2002).

P. J. Rodrigo, V. R. Daria and J. Glückstad. "Four-dimensional optical manipulation of colloidal particles." *Appl. Phys. Lett.* 86, 074103 (2005).

K. C. Neuman, E. H. Chadd, G. F. Liou, K. Bergman and S. M. Block. "Characterization of photodamage to *Escherichia coli* in optical traps." *Biophys. J.* 77, 2856-2863 (1999).

Y. Igasaki, F. Li, N. Yoshida, H. Toyoda, T. Inoue, N. Mukohzaka, Y. Kobayashi and T. Hara. "High efficiency electrically-addressable phase-only spatial light modulator." *Opt. Rev.* 6, 339-344 (1999).

L. Allen, M. W. Beijersbergen, R. J. C. Spreeuw and J. P. Woerdman. "Orbital angular-momentum of light and the transformation of Laguerre-Gaussian laser modes." *Phys. Rev. A* 45, 8185-8189 (1992).

N. R. Heckenberg, R. McDuff, C. P. Smith, H. Rubinsztein-Dunlop and M. J. Wegener. "Laser beams with phase singularities." *Opt. Quantum Elect.* 24, S951-S962 (1992).

H. He, N. R. Heckenberg and H. Rubinsztein-Dunlop. "Optical particle trapping with higher-order doughnut beams produced using high efficiency computer generated holograms." *J. Mod. Opt.* 42, 217-223 (1995).

N. B. Simpson, L. Allen and M. J. Padgett. "Optical tweezers and optical spanners with Laguerre-Gaussian modes." *J. Mod. Opt.* 43, 2485-2491 (1996).

K. T. Gahagan and G. A. Swartzlander. "Optical vortex trapping of particles." *Opt. Lett.* 21, 827-829 (1996).

H. He, M. E. J. Friese, N. R. Heckenberg and H. Rubinsztein-Dunlop. "Direct observation of transfer of angular momentum to absorptive particles from a laser beam with a phase singularity." *Phys. Rev. Lett.* 75, 826-829 (1995).

R. Agarwal, K. Ladavac, Y. Roichman, G. Yu, C. M. Lieber and D. G. Grier. "Manipulation and assembly of nanowires with holographic optical traps." *Opt. Express* 13, 8906-8912 (2005).

J. Arlt, V. Garces-Chavez, W. Sibbett and K. Dholakia. "Optical micromanipulation using a Bessel light beam." *Opt. Comm.* 197, 239-245 (2001).

S. C. Kuo and M. P. Sheetz. "Force of single kinesin molecules measured with optical tweezers." *Science* 260, 232-234 (1993).

K. Svoboda, C. F. Schmidt, B. J. Schnapp and S. M. Block. "Direct observation of kinesin stepping by optical trapping interferometry." *Nature* 365, 721-727 (1993).

L. P. Ghislain, N. A. Switz and W. W. Webb. "Measurement of small forces using an optical trap." *Rev. Sci. Instr.* 65, 2762-2768 (1994).

H. Felgner, O. Müller and M. Schliwa. "Calibration of light forces in optical tweezers." *Appl. Opt.* 34, 977-982 (1995).

J. T. Finer, A. D. Mehta and J. A. Spudich. "Characterization of single actin-myosin interactions." *Biophys. J.* 68, S291—S297 (1995).

H. Yin, M. D. Wang, K. Svoboda, R. Landick, S. M. Block and J. Gelles. "Transcription against an applied force." *Science* 270, 1653-1657 (1995).

E.-L. Florin, J. K. H. Hörber and E. H. K. Stelzer. "High-resolution axial and lateral position sensing using two-photon excitation of fluorophores by a continuous-wave Nd:YAG laser." *Appl. Phys. Lett.* 69, 446-448 (1996).

R. M. Simmons, J. T. Finer, S. Chu and J. A. Spudich. "Quantitative measurements of force and displacement using an optical trap." *Biophys. J.* 70, 1813-1822 (1996).

K. Visscher, S. P. Gross and S. M. Block. "Construction of multiple-beam optical traps with nanometer-resolution position sensing." *IEEE Journal of Selected Topics in Quantum Electronics* 2, 1066-1076 (1996).

J. C. Meiners and S. R. Quake. "Femtonewton force spectroscopy of single extended DNA molecules." *Phys. Rev. Lett.* 84, 5014-5017 (2000).

W. Singer, S. Bernet, N. Hecker and M. Ritsch-Marte. "Three-dimensional force calibration of optical tweezers." *J. Mod. Opt.* 47, 2921-2931 (2000).

S. M. Block, D. F. Blair and H. C. Berg. "Compliance of bacterial flagella measured with optical tweezers." *Nature* 338, 514-518 (1989).

A. Ashkin, K. Schütze, J. M. Dziedzic, U. Euteneuer and M. Schliwa. "Force generation of organelle transport measured in vivo by an infrared-laser trap." *Nature* 348, 346-348 (1990).

F. Gittes and C. F. Schmidt. "Interference model for back-focal-plane displacement detection in optical tweezers." *Opt. Lett.* 23, 7-9 (1998).

S. B. Smith, Y. Cui and C. Bustamante. "Optical-trap force transducer that operates by direct measurement of light momentum." *Methods in Enzymology* 361, 134-162 (2003).

J. C. Crocker and D. G. Grier. "Methods of digital video microscopy for colloidal studies." *J. Colloid Interface Sci.* 179, 298-310 (1996).

H. C. Berg and S. M. Block. "A miniature flow cell designed for rapid exchange of media under high-power microscope objectives." *Journal of General Microbiology* 130, 2915-2920 (1984).

A. Manz, N. Graber and H. M. Widmer. "Miniaturized total chemical analysis systems: A novel concept for chemical sensing." *Sens. Actuators B* 1, 244-248 (1990).

D. J. Harrison, K. Fluri, K. Seiler, Z. H. Fan, C. S. Effenhaus and A. Manz. "Micromachining a Miniaturized capillary electrophoresis-based chemical-analysis system on a chip." *Science* 261, 895-897 (1993).

D. C. Duffy, J. C. McDonald, O. J. A. Schueller and G. M. Whitesides. "Rapid prototyping of microfluidic systems in poly(dimethylsiloxane)." *Anal. Chem.* 70, 4974-4984 (1998).

M. A. Unger, H. P. Chou, T. Thorsen, A. Scherer and S. R. Quake. "Monolithic microfabricated valves and pumps by multilayer soft lithography." *Science* 288, 113-116 (2000).

J. D. Joannopoulos, R. D. Meade and J. N. Winn. *Photonic Crystals* (Princeton University Press, Princeton, 1995).

J. Martorell and N. M. Lawandy. "Observation of inhibited spontaneous emission in a periodic dielectric structure." *Phys. Rev. Lett.* 65, 1877-1880 (1990).

J. Martorell and N. M. Lawandy. "Spontaneous emission in a disordered dielectric medium." *Phys. Rev. Lett.* 66, 887-890 (1991).

B. Y Tong, P. K. John, Y-t. Zhu, Y. S. Liu, S. K. Wong and W. R. Ware. "Fluorescence-lifetime measurements in monodispersed suspensions of polystyrene particles." *J. Opt. Soc. Am. B* 10, 356-359 (1993).

M. Megens, H. P. Schriemer and A. Lagendijk. "Comment on "Spontaneous emission of organic molecules embedded in a photonic crystal"." *Phys. Rev. Lett.* 83, 5401-5401 (1999).

M. Megens, J. E. G. J. Wijnhoven, A. Lagendijk and W. L. Vos. "Light sources inside photonic crystals." *J. Opt. Soc. Am. B* 16, 1403-1408 (1999).

M. Megens, J. E. G. J. Wijnhoven, A. Lagendijk and W. L. Vos. "Fluorescence lifetimes and linewidths of dye in photonic crystals." *Phys. Rev. A* 59, 4727-4731 (1999).

W. Man, M. Megens, P. Steinhardt and P. M. Chaikin. "Experimental measurement of the photonic properties of icosahedral quasicrystals." *Nature* 436, 993-996 (2005).

A. Ashkin, J. M. Dziedzic and T. Yamane. "Optical trapping and manipulation of single cells using infrared laser beams." *Nature* 330, 769-771 (1987).

A. Ashkin. "Laser manipulation of atoms." *Nature* 330, 608-609 (1987).

A. Ashkin, J. M. Dziedzic. "Optical trapping and manipulation of single living cells using infra-red laser beams." *Berichte der Bunsen-Gesellschaft—Physical Chemistry Chemical Physics* 93, 254-260 (1989).

K. Svoboda and S. M. Block. "Biological applications of optical forces." *Annual Review of Biophysics and Biomolecular Structure* 23, 247-285 (1994).

M. Campbell, D.N. Sharp, M.T. Harrison, R.G. Denning and A.J. Tuberfield. "Fabrication of Photonic Crystals for the Visible Spectrum by Holographic Lithography." *2000 Macmillan Magazines, Ltd.*, (53-56) (2000).

Che Ting Chan. "Quasicrystals Enter Third Dimension." *2007 Nature Publishing Group.* 91-92 (2007).

Wing Yim Tam. "Icosahedral Quasicrystals by Optical Interference Holography." *2006 Appl. Phys. Lett* 89. 251111 (2006).

Jun Xu, Rui Ma, Xia Wang and Wing Yim Tam. "Icosahedral Quasicrystals for Visible Wavelengths by Optical Interference Hologography". *Optics Express*, 1403-1407 (2007).

Alexandra Ledermann, Ludovico Cademartiri, Martin Hermatschweiler, Costanza Toninelli, Geoffrey A. Ozin, Diederik S. Wiersma, Martin Wegener, and George von Freymann. "Three-Dimensional Silicon Inverse Photonic Quasicrystals for Infrared Wavelengthgs." *2006 Nature Publishing Group*, 942-945 (2006).

Markus Deubel, Georg Von Freymann, Martin Wegener, Suresh Pereira, Kurt Busch and Costas M. Soukoulis. "Direct Laser Writing of Three-Dimensional Photonic-Crystal Templates for Telecommunications". *2004 Nature Publishing Group*, (2004).

Escuti et al., "Holographic Photonic Crystals", *Optical Engineering*, Sep. 2004, pp. 1973-1987, vol. 43, No. 9, Society of Photo-Optical Instrumentation Engineers.

Guidoni et al., "Quasiperiodic Optical Lattices", *Physical Review Letters*, Nov. 3, 1997, pp. 3363-3366, vol. 79, No. 18, The American Physical Society.

Kaliteevski et al., "Two-Dimensional Penrose-Tiled Photonic Quasicrystals: Diffraction of Light and Fractal Density of Modes", *Journal of Modern Optics*, pp. 1771-1778, 2000, vol. 47, No. 11, Taylor & Francis, Ltd., UK.

Sinclair et al., "Assembly of 3-Dimensional Structures Using Programmable Holographic Optical Tweezers", *Optics Express*, Nov. 1, 2004, pp. 5475-5480, vol. 12, No. 22, Optical Society of America, USA.

Swanson et al., "Diffractive Optical Elements for Use in Infrared Systems", *Optical Engineering*, Jun. 1, 1989, pp. 605-608, vol. 28 No. 6.

\* cited by examiner

BEST AVAILABLE COPY $z$ [μm]

US 7,981,774 B2

ASSEMBLY OF QUASICRYSTALLINE PHOTONIC HETEROSTRUCTURES

CROSS-REFERENCE TO RELATED PATENT APPLICATIONS

The present application claims priority to U.S. Provisional Application No. 60/697,872, filed on Jul. 8, 2005 and incorporated herein by reference in its entirety.

This work was supported by the National Science Foundation through Grant Numbers DMR0451589, DMR021306 and DMR0243001, and US Department of Energy grant DE-FG02-91ER40671.

FIELD OF THE INVENTION

This invention relates generally to the field of quasicrystalline heterostructures. More particularly the invention relates to the assembly of quasicrystalline photonic heterostructures with specified orientational symmetry in two dimensions, or along any two dimensions in a three-dimensional structure, or with any specified three-dimensional quasicrystalline symmetry, and also the use of holographic optical traps (HOTS) to perform that assembly and to the use of those HOTS assembled structures for a variety of uses.

BACKGROUND OF THE INVENTION

Crystalline materials have long been exploited in many optical and electronic applications for physical properties arising from their crystalline symmetry. Although such crystalline materials allow many technological applications to be fulfilled, there are limitations imposed by such crystalline symmetry. For example, ordered arrangements of dielectric materials with alternating domains of high and low index of refraction are known to exhibit a property for the transmission of light known as a photonic bandgap. The optical properties of a photonic bandgap material are characterized by a range of frequencies of light for which light cannot propagate, nor is it absorbed. This property is analogous to the electronic bandgaps that arise in semiconductors for the transport of electrons, and should result in a similarly broad spectrum of applications. The extent of a material's photonic bandgap depends both on the dielectric properties of the constituent dielectric materials and also on the symmetries of their three-dimensional arrangement. The limited set of distinct symmetries available for crystalline arrangements require a very large contrast in dielectric constant to achieve a full photonic bandgap, and these symmetries result in optical materials whose optical properties are very sensitive to structural and chemical defects. By contrast, quasicrystals are known that have far higher rotational symmetries than is possible for crystals. They consequently should exhibit larger and more uniform photonic bandgaps than any crystalline arrangement of the same materials, and should have optical properties that are more robust against defects and disorder. Two-dimensional and three-dimensional quasicrystalline arrangements of materials therefore should have a wide range of technological applications based on their optical and other physical properties.

SUMMARY OF THE INVENTION

It is therefore an object of the invention to provide an improved system and method for fabricating quasicrystalline structures.

It is another object of the invention to provide an improved system and method for fabricating quasicrystalline photonic heterostructures using holographic optical traps.

It is also an object of the invention to provide an improved article of manufacture of a three dimensional quasicrystalline photonic heterostructure.

It is a further object of the invention to provide an improved system and method for constructing materials having photonic band gaps forbidden in crystalline materials.

It is yet another object of the invention to provide an improved system and method for constructing rotationally symmetric heterostructures having optical, mechanical, chemical, biological, electrical and magnetic properties unachievable by crystalline materials.

It is an additional object of the invention to provide an improved quasicrystalline heterostructure having programmable optical, mechanical, biological, electrical, magnetic and chemical properties.

It is also another object of the invention to provide an improved system and method for constructing a quasicrystalline structure with specified Brillouin zones for selected technological applications.

It is also a further object of the invention to provide an improved system and method for constructing a quasicrystalline material with a substantially spherical Brillouin zones.

It is yet an additional object of the invention to provide an improved system and method for constructing a quasicrystalline material having long range orientational order without transitional periodicity and constructed to operate in a predetermined manner responsive to at least one of an electrical field, a magnetic field and electromagnetic radiation.

It is also a further object of the invention to provide an improved system and method for constructing quasicrystalline heterostructures which can be switched from one structural state to another state by repositioning particles to thereby modify physical, biological, and chemical properties of the arrangement.

It is still another object of the invention to provide an improved system and method for constructing quasicrystalline heterostructures by use of holographic optical traps to dynamically modify chemical and physical properties in accordance with time sensitive requirements.

It is another object of the invention to provide an improved system and method for constructing quasicrystalline heterostructures having holographic optical traps to form engineered features which enable creation of narrow band waveguides and frequency selective filters of electromagnetic radiation.

It is yet another object of the invention to provide an improved system and method for organizing disparate components using holographic optical traps to position selectable components in a quasicrystalline heterostructure for establishing chemical, biological and physical properties for a desired technological application.

It is also an object of the invention to provide an improved system, method of manufacture and article of manufacture with deliberately incorporated defects for programmably achieving a variety of electrical, optical, magnetic, mechanical, biological and chemical properties and applications.

It is yet an additional object of the invention to provide an improved method and article of manufacture of a quasicrystal with replaced spheres or other components of different size or shape to modify local photonic characteristics of the quasicrystal.

It is a further object of the invention to provide an improved method and article of manufacture with selective replacement of one or more spheres on other molecular component geometries of different chemical composition or at different sites than a given quasicrystalline site to create new properties or break the quasicrystalline symmetry to create new properties for a variety of applications.

It is another object of the invention to provide an improved method and article of manufacture of a quasicrystal with a particular domain having a topological defect, such as a phase slip, like a grain boundary in ordinary crystalline molecules, thereby giving rise to new useful properties.

It is another object of the invention to provide an improved method and article of manufacture of two or more quasicrystalline domains created by holographic trap manipulation to create higher order structures with the resulting combination having optical properties selected from each component domain.

It is still an additional object of the invention to provide an improved method and article of manufacture for creating combinations of one or more quasicrystalline domains with one or more crystalline domains to create useful higher order structures.

It is a further object of the invention to provide an improved method and article of manufacture involving assembly of crystalline and quasicrystalline domains using optical tweezers and/or other particle force assembly methodologies including self assembly, electrophoresis, and optical gradient fields to create useful combination structures.

These and other objects, advantages and features of the invention, together with the organization and manner of operations thereof, will become apparent from the following detailed description when taken in conjunction with the accompanying drawings described below.

DETAILED DESCRIPTION OF PREFERRED EMBODIMENTS

A system and method have been developed for the construction of quasicrystalline heterostructures for a wide variety of technological applications. Various articles of manufacture and compositions of matter can be prepared. In a most preferred embodiment, holographic optical traps are used as the starting tool to position a selected particle in a given position. Therefore, in the preferred embodiment the approach is based on the well known holographic optical trapping technique in which computer-generated holograms are projected through a high numerical aperture microscope objective lens to create large three dimensional arrays of optical traps. In our implementation, light at 532 nm from a frequency doubled diode-pumped solid state laser (Coherent Verdi) is imprinted with phase only holograms using a liquid crystal spatial light modulator (SLM) (Hamamatsu X8267 PPM). The modified laser beam is relayed to the input pupil of a 100×NA 1.4 SPlan Apo oil immersion objective mounted in an inverted optical microscope (Nikon TE2000U), which focuses it into optical traps. The same objective lens is used to form images of trapped objects by using the microscope's conventional imaging train. As a soft fabrication technique, holographic assembly requires substantially less processing than conventional methods such as electron beam lithography and can be applied to a wider range of materials. Assembly with holographic optical traps lends itself readily to creating nonuniform architectures (e.g., microstructural arrangements, articles of manufacture and compositions of matter) with specifically engineered features, such as the channel embedded in the octagonal domain in FIG. 1(d). Such structures can, for example, act as narrowband waveguides and frequency-selective filters for visible light.

Holographic trapping's ability to assemble free-form heterostructures extends also to three dimensions. The sequence of images of a rolling icosahedron in FIG. 2(a)-(d) show how the colloidal spheres' appearance changes with distance from the focal plane. This sequence demonstrates that holographic trapping with a single laser beam can successfully organize spheres into vertical stacks along the optical axis, while maintaining one sphere in each trap.

Figure 3A:
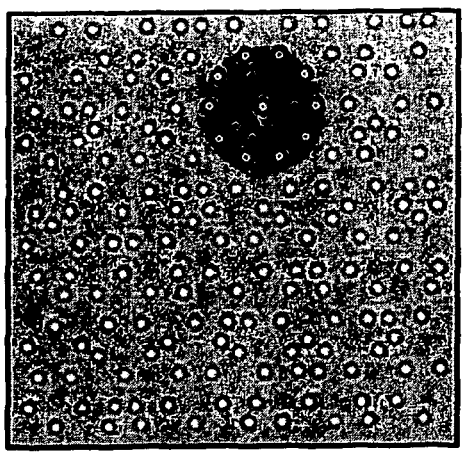
FIG. 3(a) shows a holographic assembly of a three dimensional colloidal quasicrystal with the particles trapped in a two dimensional projection of a three dimensional icosahedron quasicrystalline lattice.
Figure 3B:
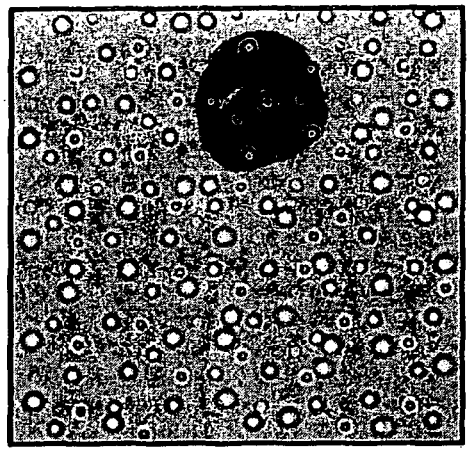
FIG. 3(b) shows particles displaced into the fully three dimensional configuration with the shaded region the one embedded icosahedron.
Figure 3C:
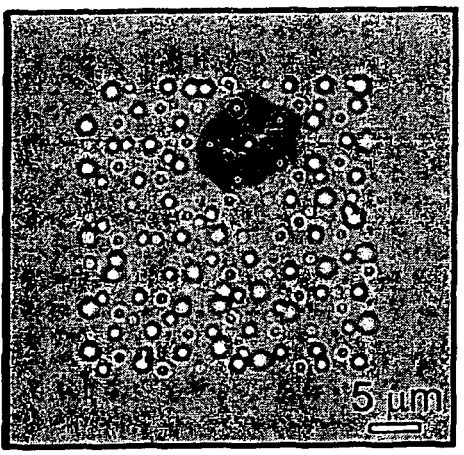
FIG. 3(c) shows reducing the lattice constant to create a compact three dimensional quasicrystal.
Figure 3D:
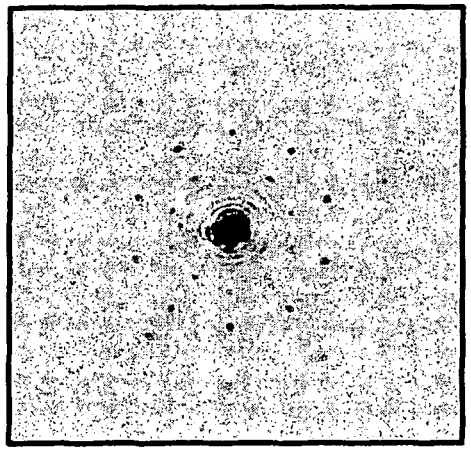
FIG. 3(d) illustrates a measured optical diffraction pattern displaying 10-fold symmetric peaks for the constructed quasicrystal.
Figure 3E:
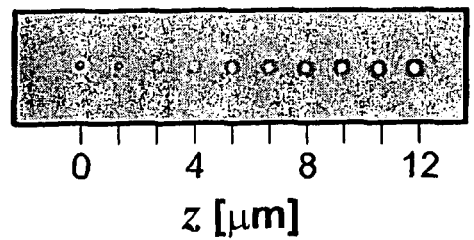
FIG. 3(e) illustrates the progressive assembly of the colloidal quasicrystal illustrated in FIG. 3(a)-(d).

The icosahedron itself is the fundamental building block of a class of three dimensional quasicrystals, such as the example in FIGS. 3(a)-(d). Building upon our earlier work on holographic assembly, we assemble a three dimensional quasicrystalline domain by first creating a two dimensional arrangement of spheres corresponding to the planar projection of the planned quasicrystalline domain (see FIG. 3(a)). Next, we translate the spheres along the optical axis to their final three dimensional coordinates in the quasicrystalline domain, as shown in FIG. 3(b). One icosahedral unit is highlighted in FIGS. 3(a) and (b) to clarify this process. Finally, the separation between the traps is decreased in FIG. 3(c) to create an optically dense structure. This particular domain consists of 173 spheres in 7 layers, with typical interparticle separations of 3 μm.

The completed quasicrystal was gelled and its optical diffraction pattern recorded at a wavelength of 632 nm by illuminating the sample with a collimated beam from a HeNe laser, collecting the diffracted light with the microscope's objective lens and projecting it onto a charge-coupled device (CCD) camera with a Bertrand lens. The well defined diffraction spots clearly reflect the quasicrystal's five-fold rotational symmetry in the projected plane.

Holographic assembly of colloidal silica quasicrystals in water is easily generalized to other materials having selectable optical, electrical, magnetic, chemical and mechanical properties for a wide variety of technological applications. Deterministic organization of disparate components under holographic control can be used to embed gain media in photonic band gap (PBG) cavities, to install materials with nonlinear optical properties within waveguides to form switches, and to create domains with distinct chemical functionalization. The comparatively small domains we have created can be combined into larger heterostructures through sequential assembly and spatially localized photopolymerization. In all cases, this soft fabrication process results in mechanically and environmentally stable materials that can be integrated readily into larger systems.

Beyond the immediate application of holographic trapping to fabricating quasicrystalline materials, the ability to create and continuously optimize such a variety of articles of manufacture and compositions of matter enables new opportunities for achieving heretofore unattainable products and perform processes not possible. Many other functionalities can be performed, such as evaluating the dynamics and statistical mechanics of colloidal quasicrystals. The optically generated quasiperiodic potential energy landscapes described herein also can provide a flexible model system for experimental studies of transport through aperiodically modulated environments.

In other embodiments, the above described methods of fabricating and manipulating quasicrystalline structures can further be employed to manipulate compositions of matter to introduce a variety of particular defects which can establish useful electrical, optical, biological, mechanical, magnetic and chemical attributes. Due to the many degrees of freedom available by virtue of the ability to establish these quasicrystalline structures and associated defects, one can achieve numerous different physical, mechanical and chemical properties, many of which are unachievable with crystalline or amorphous structures. These properties can be used in a wide variety of commercial areas spanning the electronics, computer, biological, chemical, optical, mechanical properties and magnetics fields.

The technique further permits the manufacture of quasicrystals with replacement of spheres, or other components, with different size or shape spheres or different size or shape components, enabling modification of properties, such as, for example, photonic characteristics. This concept can also be applied to replace spheres or other size and shape component groups at selected locations with constituents of different chemical, mechanical, electrical, magnetic or optical character, thereby allowing controlled designs of quasicrystalline arrangements with different selectable properties useful in many commercial fields.

In other embodiments domains of quasicrysals can be selectively modified to introduce phase slip boundaries, similar to grain boundaries in crystalline materials, to develop properties of interest for commercial exploitation. In addition, two or more quasicrystalline domains can be created by optical trap manipulation of particles to generate higher order structural components with physical and/or chemical properties characteristic of the properties of each component domain. In addition, such combinations can be integrated with crystalline domains to create further higher order structures for selectable commercial applications.

The assembly of all these structures can be accomplished not only by use of optical tweezers but also by other particle force movement force sources. These other force movement sources can be used alone or in combination with the optical tweezers and these other particle force sources can include at least one of self assembly, other photonic methodologies and controllable electrical and magnetic fields. These methodologies allow controlled construction of virtually any desired structure exhibiting a wide range of programmed physical, biological or chemical properties.

The following non-limiting example describes one method of assembling colloidal particles as a quasicrystal.

EXAMPLE

Colloidal silica microspheres 1.53 µm in diameter (Duke Scientific Lot 5238) can be organized by first being dispersed in an aqueous solution of 180:12:1 (wt/wt) acrylamide, N,N-methylenebisacrylamide and diethoxyacetophenone (all Aldrich electrophoresis grade). This solution rapidly photopolymerizes into a transparent polyacrylamide hydrogel under ultraviolet illumination, and is stable otherwise. Fluid dispersions were imbibed into 30 µm thick slit pores formed by bonding the edges of #1 coverslips to the faces of glass microscope slides. The sealed samples were then mounted on the microscope's stage for processing and analysis.

Figure 1A:
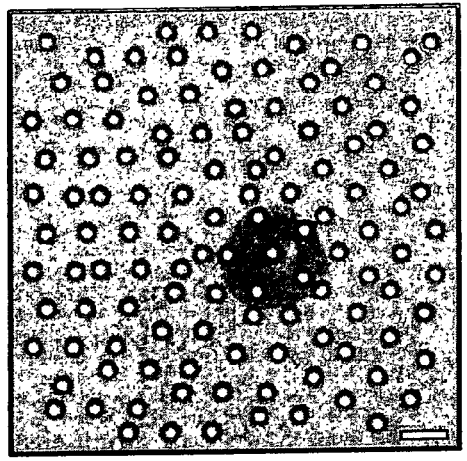
FIG. 1(a) illustrates a view of silica spheres organized by holographic optical tweezers into a planar pentagonal quasicrystal (the scale bar indicates 5 micrometers)
Figure 1B:
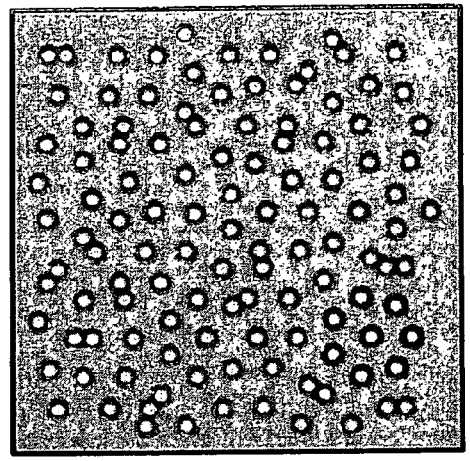
FIG. 1(b) illustrates a heptagonal quasicrystalline domain.
Figure 1C:
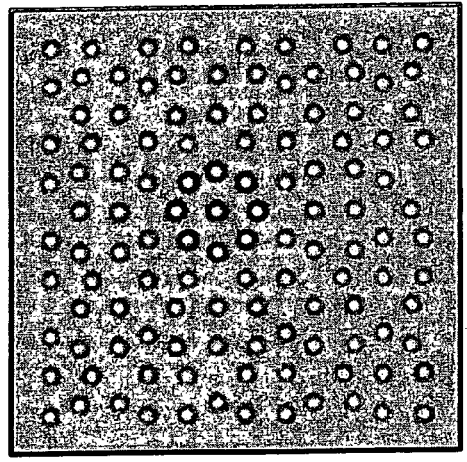
FIG. 1(c) illustrates an octagonal quasicrystalline domain arrangement.
Figure 1D:
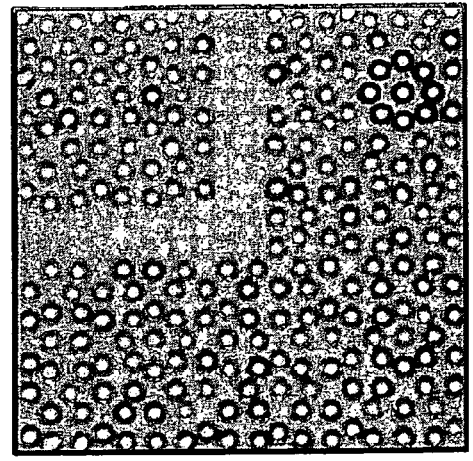
FIG. 1(d) illustrates an octagonal quasicrystalline domain with an embedded waveguide.
Figure 2A:
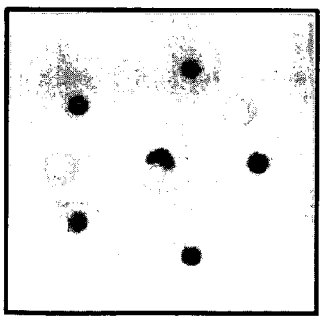
FIG. 2(a) illustrates a first of four views of an icosahedron assembled from dielectric colloidal spheres using holographic optical traps.
Figure 2A:
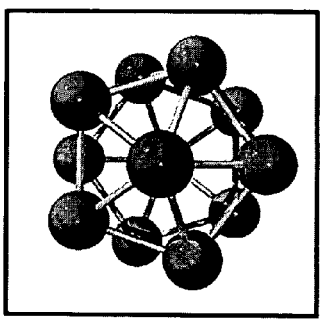
Figure 2B:
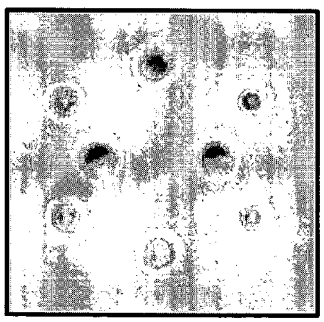
FIG. 2(b) illustrates a second view with a 2-fold symmetry axis.
Figure 2B:
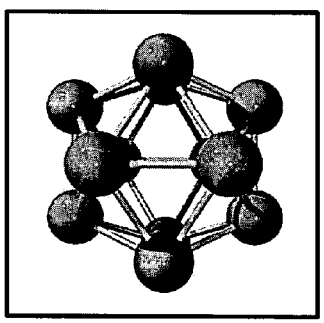
Figure 2C:
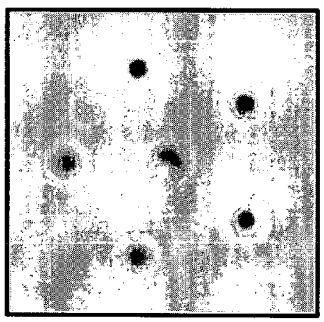
FIG. 2(c) illustrates a third view with a 5-fold symmetry axis and FIG. 2(d) illustrates a fourth view midplane.
Figure 2C:
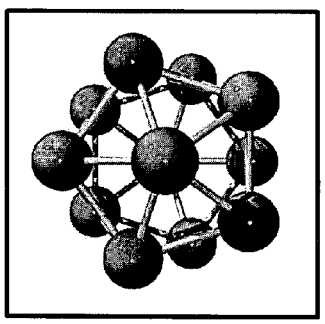
Figure 2D:
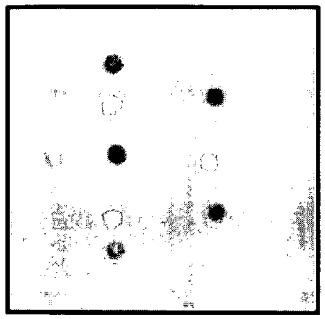
Figure 2D:
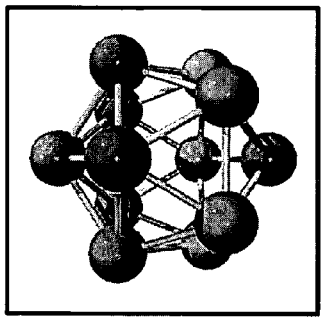
Figure 2E:
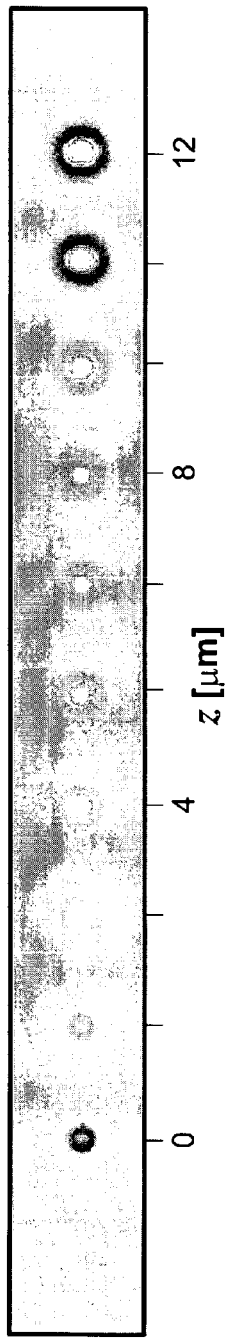
FIG. 2(e) illustrates the progressive assembly of the colloidal quasicrystal illustrated in FIG. 2(a)-(d)

Silica spheres are roughly twice as dense as water and sediment rapidly into a monolayer above the coverslip. A dilute layer of spheres is readily organized by holographic optical tweezers into arbitrary two dimensional configurations, including the quasicrystalline examples in FIGS. 1(a)-(d). FIGS. 1(a), (b) and (c) show planar pentagonal, heptagonal and octagonal quasicrystalline domains, respectively, each consisting of more than 100 particles. Highlighted spheres emphasize each domain's symmetry. These structures all have been shown to act as two dimensional PBG materials in microfabricated arrays of posts and holes. FIG. 1(d) shows an octagonal quasicrystalline domain with an embedded waveguide.

While preferred embodiments have been illustrated and described, it should be understood that changes and modifications can be made therein in accordance with one of ordinary skill in the art without departing from the invention in its broader aspects. Various features of the invention are defined in the following claims.

What is claimed is:

1. An article of manufacture consisting essentially of an icosahedral quasicrystalline arrangement of selected particles in an icosahedral symmetry embedded in a matrix or domain of the article of manufacture wherein the icosahedral quasicrystalline arrangement includes at least one unit which is not repeated and thereby providing quasicrystalline symmetry in each of the units relative to other ones of the units of icosahedral quasicrystalline arrangement, each of the icosahedral structural units being positioned at a selected given position in the matrix and within the article of manufacture and deterministically organized by using holographic optical traps for translating each of the particles to move the selected particles to the selected given position with final three dimensional coordinates which arise from assembly being accomplished by use of the holographic optical traps established in accord with holographic control.

2. The article of manufacture as defined in claim 1 wherein the properties different than its corresponding crystalline chemical counterpart comprise at least one of photonic band gap, mechanical properties, biological properties, magnetic properties, electrical properties, optical properties and chemical properties.

3. The article of manufacture as described in claim 1 wherein the quasicrystalline material includes at least one of programmed defects, replaced ones of the particles of different size or shape, phase slip boundaries and mixtures of different domains of at least one of quasicrystalline and crystalline domains.

4. The article of manufacture as defined in claim 1 wherein the structure of particles forms:

at least a microscopic size structure of material in three dimensions; and the arrangement of the microscopic size structure of particles by the optical traps being a three dimensional arrangement having at least one five-fold rotational symmetry in a projected plane.

5. The article of manufacture as defined in claim 1 wherein the particular engineered feature is selected from the group of a channel embedded in a domain, a narrowband waveguide and a frequency selective filter.

6. The article of manufacture as defined in claim 4 wherein the three dimensional structure of particles comprises a freeform heterostructure.

7. The article of manufacture as defined in claim 4 wherein the three dimensional structure of particles comprises a three dimensional quasicrystalline structure.

8. The article of manufacture as defined in claim 4 wherein the quasicrystalline structure is comprised of a plurality of icosahedral quasicrystalline arrangements having units to form a domain of the units suitable for commercial applications.

9. The article of manufacture as defined in claim 4 further including a gain media particle disposed in the three dimensional structure of particles.

10. The article of manufacture as defined in claim 4 wherein the three dimensional structure includes particles with non-linear optical properties designed in an embedded waveguide form for the article of manufacture, thereby enabling use of processing electromagnetic radiation.

11. The article of manufacture as defined in claim 10 wherein the domain includes a chemical functionalization component.

12. The article of manufacture as defined in claim 4 wherein the three dimensional structure includes a quasi-periodic potential energy landscape having five fold symmetry in a quasicrystalline manner for each of the icosahedral units.

13. The article of manufacture as defined in claim 4 further including a particular defect disposed in the three dimensional structure, thereby establishing a selected property.

14. The article of manufacture as defined in claim 13 wherein the property is selected from the group consisting of an electrical property, an optical property, a biological property, a mechanical property and a chemical property.

15. The article of manufacture as defined in claim 4 wherein the three dimensional structure of particles includes replaced particles with at least one of different size, different shape, different chemical property, different optical property, different mechanical property, different electrical property and different magnetic property.

16. The article of manufacture as defined in claim 4 wherein the three dimensional structure of particles includes a phase slip boundary, thereby creating a useful mechanical property of interest.

17. The article of manufacture as defined in claim 4 further including a plurality of quasicrystalline domains created by optical trap manipulation and positioning.

18. The article of manufacture as defined in claim 4 wherein the three dimensional structure includes crystalline domains.

19. An article of manufacture including a matrix portion and with another portion disposed therein consisting essentially of at least one icosahedral quasicrystalline arrangement or unit of particles being positioned at a selected given position with final three dimensional coordinates within the article of manufacture and the particles deterministically organized to be moved to the selected given position in the matrix portion to form the another portion by the steps consisting of creating a plurality of optical traps, attaching each of the optical traps to a particular particle and directly moving each of the particles to the selected given positions in the article of manufacture and the particles being associated with the icosahedral quasicrystalline arrangement, the quasicrystalline arrangement of the particles having properties different than the particles' corresponding crystalline chemical counterpart and the matrix portion, thereby achieving particular engineered features by virtue of manipulating the structure of particles in the given quasicrystalline positions which thereby dictate engineering features of the quasicrystalline arrangement of particles and the article of manufacture.

20. An article of manufacture including a matrix portion and with at least another portion consisting essentially of at least one icosahedral quasicrystalline arrangement of particles in an icosahedral symmetry wherein the icosahedral quasicrystalline arrangement includes a unit which is not repeated and thereby providing quasicrystalline symmetry relative to the matrix portion and to adjacent ones of the units of icosahedral quasicrystalline arrangement, each of the icosahedral structural units being at given positions with final three dimensional coordinates within the article of manufacture and the matrix portion, the given positions of the particles arising from assembly being accomplished by use of optical traps to move the particles to the given positions in accord with holographic control and a portion of the particles of the matrix portion of the article of manufacture not having icosahedral symmetry.

21. The article of manufacture as defined in claim 20 wherein the properties different than its non-icosahedral counterpart comprise at least one of photonic band gap, mechanical properties, biological properties, magnetic properties, electrical properties, optical properties and chemical properties.

22. The article of manufacture as described in claim 20 wherein the quasicrystalline arrangement of particles includes at least one of programmed defects, replaced ones of the particles of different size or shape, phase slip boundaries and mixtures of different domains of at least one of quasicrystalline and crystalline domains.

* * * * *